H. PETIT.
MEAN SPEED INDICATOR.
APPLICATION FILED SEPT. 11, 1916.
1,350,620.
Patented Aug. 24, 1920.
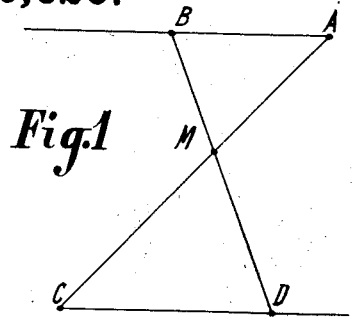
Fig.1
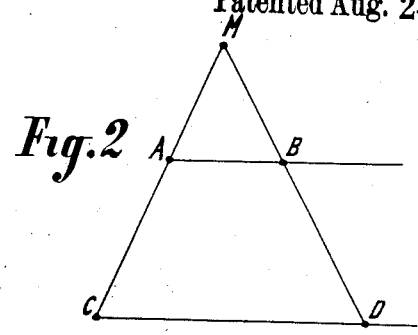
Fig.2
Fig.3
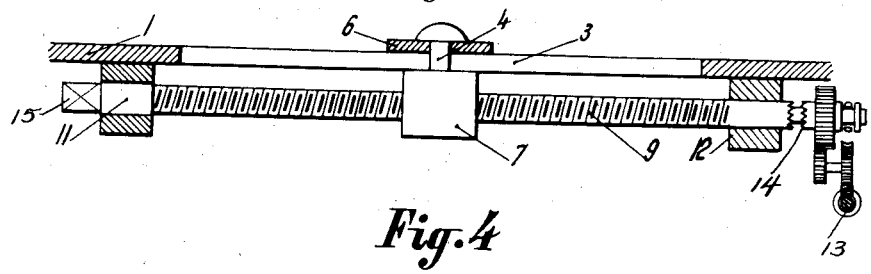
Fig.4
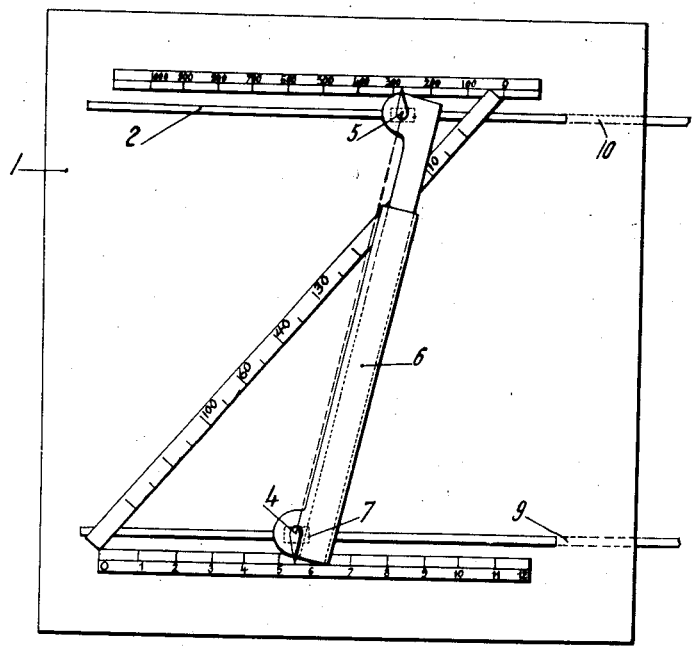
Inventor
Henri Petit

UNITED STATES PATENT OFFICE.

HENRI PETIT, OF ERMONT, FRANCE.

MEAN-SPEED INDICATOR.

1,350,620.     Specification of Letters Patent.    Patented Aug. 24, 1920.

Application filed September 11, 1916. Serial No. 119,489.

*To all whom it may concern:*

Be it known that I, HENRI PETIT, engineer, of Villa Plaisance, at Ermont, Department of the Seine and Oise, France, citizen of the French Republic, have invented certain new and useful Improvements in Mean-Speed Indicators; and I do hereby declare the following to be a full, clear, and exact description of the invention, such as will enable others skilled in the art to which it appertains to make and use the same.

The invention has for its object a simple apparatus indicating the mean speed of a rotating piece of machinery or the mean distance traveled by a vehicle, in the unit of time.

The well known properties of similar triangles have been made use of in order to obtain immediately the mean speed by reading off a single graduated scale.

In order to understand the working of the apparatus reference is to be had to the diagrams Figures 1 and 2 in which A B and C D are two straight parallel lines. If we assume that a point starting from A moves along A B at a speed exactly proportional to the actual distance run over by the vehicle in a given time (or the number of turns of the revolving body) it is plain that when the point A reaches any point B say, the length A B is equal to the distance traveled multiplied by a constant which constant is the ratio of the chosen units. Consequently if $d$ is the distance traveled by the vehicle and $k$ the constant of proportionality we have A B $= k\,d$.

We may assume the same way of dealing with the time spent during the displacement of A to B; on the line C D a point O moves from C to D while A moves from A to B and the speed of O is directly proportional to the time. If we call $h$ the second constant we have if $t$ is the exact time spent: C D $= h\,t$.

If we join the points A with C and B with D by straight lines they will intersect each other at a point M and we finally get the following equalities:

$$\frac{AB}{CD} = \frac{AM}{MC} = \frac{k\,d}{h\,t} = R\,V$$

in which $R = \frac{k}{h}$ = constant and V the mean speed $= \frac{d}{t}$ that is the quotient of the true distance traveled $d$ and the true time spent $t$.

It follows from the above, according to a well known geometrical theorem, that there is somewhere on the line A C, either inside or outside of the points A, C, one particular point and one point only M for which the ratio $\frac{AM}{MC}$ is equal to a given value; but V the mean speed is equal to this ratio, consequently to one particular position of M corresponds one particular value of V.

The apparatus which forms the object of this invention consists in utilizing the above properties by moving the point D along one of the straight lines by means of clock work with or without reducing gear, while the point D is constantly moved along proportionately to the distance run over by the vehicle or to the number of turns of the rotating part the mean speed of which it is desired to measure.

Figs. 3 and 4 show how an apparatus operating according to the above can be easily constructed. The apparatus shown in Fig. 4 comprises a platen 1 provided with two parallel slots 2 and 3, wherein slide two studs 4 and 5 connected together by a bar 6; the said bar which can rotate in 4 and 5 is made in two parts one sliding into the other so that its length is variable. Each stud comprises, moreover, the nuts 7 and 8, Figs. 3 and 4 wherein pass screw threaded rods 9 and 10 suitably carried by bearings 11 and 12 fixed to the platen.

The screw 9 is actuated by suitable clock work the nut 7 moving proportionally to time while the screw 10 is operated by the moving body through suitable reducing gear, the nut 8 moving consequently proportionally to the speed of said body the mean of which is to be measured. It is plain that in both cases the reducing gear may be of any well known type according to the desired result to be obtained by the apparatus; the mean speed for instance may be expressed in miles per hour or in feet per second and it is obvious that both scales and reducing gears would be different in the two cases.

On Fig. 3 is shown diagrammatically an endless screw 13 and suitable gearing which can be put in or out of gear by a clutch 14. It must be clearly understood that the way of imparting motion to the nuts 7 and 8 has nothing to do with the invention.

The clutch 14 is necessary in order to bring back the nuts 7 and 8 to zero, the screws being revolved by hand with a key fitting into the square end 15 of the screw Fig. 3.

The bar 6 may be made in one part only instead of two as shown in Fig. 4, in this case the upper stud 5 would slide in a slot cut into the bar 6 which would oscillate only at the other end on the stud 4.

It follows from the above that the apparatus is thus capable of indicating:

1°—The distance traveled by a vehicle or the number of revolutions of a revolving body, upper scale of Fig. 4 during a certain time.

2°—The time during which the above was obtained lower scale.

3°—The mean speed by means of the movable bar.

The device could, if desired, indicate the mean speed, stoppages being deducted, it would be only necessary to provide means to bring to a standstill the mechanism "time" as soon as the vehicle stops.

In operating the device to obtain a direct reading of the mean speed, there is provided a diagonal scale 6' adapted to coöperate with the upper and lower scales on the platen, the said scale being placed in position on the platen so that the edge of the scale adjoining the graduations thereon will be in contact with the zero points on the upper and lower scales corresponding to the points A and C of Fig. 1. With this arrangement the reading can be had without solving the equation $\frac{AB}{CD} = \frac{kd}{ht}$ on account of the equality $\frac{AB}{CD} = \frac{AM}{MC}$ for the point M corresponds to one mean speed and no other and the point could be read on the diagonal scale divided accordingly. This intermediate scale working in combination with the upper and lower scales on the platen and the movable bar 6 provides a very simple and efficient means for immediately determining the mean speed of a traveling vehicle or any rotary mechanism.

I claim:

1. In an apparatus for indicating the mean speed of a rotating part, a pair of parallel scales, a scale extending diagonally between the parallel scales, and a movable bar intersecting the diagonal scale and movable along the parallel scales, the point of intersection of the movable bar with the diagonal scale indicating the mean speed of the rotating part, the points of contact of the movable bar with the parallel scales moving, one in proportion to the time, and the other to the distance of rotation of the rotating part.

2. In an apparatus for indicating the mean speed of a rotating part, the combination with a platen provided with two parallel slots, studs extending through said slots and having nuts thereon, a screw-threaded rod engaging each of said nuts, one of said rods being rotated by the rotating part, and the other rod adapted to be rotated by clock work, a rod connecting the studs, a diagonal scale intersecting said connecting rod and indicating at the point of intersection the mean speed of the rotating part.

In testimony whereof I affix my signature, in presence of two witnesses.

HENRI PETIT.

Witnesses:
CHAS. P. PRESSLY,
HENRI COHEN.